United States Patent [19]

Lee

[11] 3,714,515

[45] Jan. 30, 1973

[54] HOUSING ASSEMBLY OF MODULAR CONSTRUCTION FOR SOLID STATE RELAYS WITH PLURAL EXTERNAL TERMINALS

[75] Inventor: Art Lee, El Paso, Ill.

[73] Assignee: General Electric Company

[22] Filed: Sept. 20, 1971

[21] Appl. No.: 182,058

[52] U.S. Cl................317/118, 200/168 K, 317/100, 337/381

[51] Int. Cl.............................H02b 1/08, H05k 7/20

[58] Field of Search....174/DIG. 5, 60; 317/100, 101, 317/101 R, 101 DH, 101 CB, 113, 118, 120; 200/168 A, 168 B, 168 E, 168 K; 335/202; 337/113, 132, 381

[56] References Cited

UNITED STATES PATENTS

| | | | |
|---|---|---|---|
| 2,913,552 | 11/1959 | Roberts | 337/113 |
| 3,443,162 | 5/1969 | Nudelmont | 317/118 |
| 3,579,046 | 5/1971 | Jordan | 317/120 |
| 3,601,661 | 8/1971 | Kleinhample | 317/100 |
| 3,420,942 | 1/1969 | Kadah | 317/100 |
| 3,549,783 | 12/1970 | Rendrick | 317/101 R |
| 3,383,653 | 5/1968 | Bolton | 317/101 R |
| 3,566,190 | 2/1971 | Huebner | 317/101 DH |

*Primary Examiner*—Herman J. Hohauser
*Assistant Examiner*—Gerald P. Tolin
*Attorney*—Frank L. Neuhauser et al.

[57] ABSTRACT

A housing of modular construction, preferably for use in solid state unit pole relays, comprising a multi-purpose molded cap capable of being used either by itself in pairs to form a complete enclosure for the circuitry of a power pole of a solid state relay, or in pairs in conjunction with a central core to form the enclosure for the circuitry of a driver unit of a solid state relay.

8 Claims, 8 Drawing Figures

INVENTOR
ART LEE
BY Arthur E. Fournier Jr.
ATTORNEY

INVENTOR
ART LEE

BY Arthur E Fournier Jr.

ATTORNEY

HOUSING ASSEMBLY OF MODULAR CONSTRUCTION FOR SOLID STATE RELAYS WITH PLURAL EXTERNAL TERMINALS

BACKGROUND OF THE INVENTION

1. Field of the Invention

My invention relates to solid state relays, and more particularly to an improvement in the housing for solid state relays of the type employed in modular systems for providing solid state power control.

2. Description of the Prior Art

A multitude of different types of housings have been provided heretofore in the prior art for the purpose of enclosing the operating components of electrical devices. Although such housings have been available in a variety of different shapes and sizes, they have essentially all had several features in common. For example, the housings have commonly included means for making external connections thereto, means for insulating the electrical components from each other as well as means for providing insulation between adjacently mounted units, and means for providing protection to the housed operating components from deleterious elements often present in the environment in which the particular relay is being employed. In addition, the relay housings have of necessity been required to provide some form of heat dissipation means for dissipating the heat generated within the interior of the housing as a result of the operation of the electrical components enclosed therein.

Considering more particularly relays of the solid state type, such relays have conventionally been organized in such a manner as to include a maximum of four poles and with the latter poles being stacked vertically in two layers. As the need has arisen for increasing the capacity of solid state relays, two major disadvantages of the prior art forms of such relays have become most evident. The first is that the prior art designs are limited in the number of poles which may be provided in any given relay inasmuch as it is not possible either from a physical or an electrical standpoint to vertically stack more than two levels of poles in any one given solid state relay without necessitating the complete redesign of the relay. Further the heat dissipation capability of such prior art forms of four pole solid state relays although adequate to dissipate the heat generated by up to four poles is not sufficient to accommodate the heat generated within the interior of the relay were the relay to be provided with more than four poles. This latter limitation results primarily from the physical housing restrictions embodied in the prior art designs.

Also, the relays heretofore available in the prior art by virtue of being limited in capacity to a maximum of four poles have posed a problem to the user from the standpoint of their inherent lack of flexibility of use. Thus, for example, a user having purchased a relay for use in a specific application requiring four poles who subsequently finds that his work requirements now dictate a need for five poles or more is unable to utilize the previously purchased relay in the new application because the individualized nature of the structural configuration of the prior art forms of relays has most often precluded such different alternative usages. In addition, the need on the part of the manufacturer of such prior art forms of solid state relays to manufacture a multiplicity of versions thereof for use in situations which require more than four poles is undesirable because it prevents him from taking full advantage of the economies of mass production. Finally, the need to stock all these different versions of solid state relays adds to the cost of doing business on the part of the distributor who must maintain an adequate inventory thereof and as such a larger inventory of relays than would be otherwise necessary if the capacity of each relay were capable of being readily augmented.

OBJECTS OF THE INVENTION

It is therefore an object of the present invention to provide a novel and improved housing of modular construction which is capable of being used by itself to form a complete enclosure for the circuitry of a power pole of a solid state relay.

It is another object of the present invention to provide such a housing of modular construction which also has the capability of being used in conjunction with a central core to form the enclosure for the circuitry of a driver unit of a solid state relay.

A further object of the present invention is to provide such a housing of modular construction for a solid state unit pole relay which enables the pole capacity of the relay to be readily augmented without requiring extensive structural modification in the relay.

A still further object of the present invention is to provide such a housing of modular construction for a solid state unit pole relay which is provided with sufficient heat dissipation means to adequately dissipate the amount of heat generated within the housing during the operation of such relays having augmented pole capacity.

Yet another object of the present invention is to provide such a housing of modular construction for a solid state unit pole relay which includes the inherent flexibility of being capable of being readily adapted by the user for employment in different applications as the user's work requirements for a relay change.

Yet a further object of the present invention is to provide such a housing of modular construction for a solid state unit pole relay which is relatively inexpensive to manufacture, easy to assemble, and easy to apply in a given application.

SUMMARY OF THE INVENTION

In accordance with a preferred form of the invention there is provided a housing of modular construction, preferably for use in solid state unit pole relays, including a multi-purpose molded cap which is used either by itself in pairs to form a total enclosure for the power poles of a solid state unit pole relay, or in conjunction with a central core to form a driver unit. When used as a power pole, the two molded parts and an extruded aluminum heat sink form a complete enclosure that accommodates the electronic circuitry and further cooperates to retain the wire clamp terminals at the top and the pulse pin terminals at the bottom. The heat sink has an extended portion along its bottom edge that fits into recesses on each half of the molded part. The screw clamp terminals fit on raised shaped bosses and the pins fit into slots and are retained by a small projection. When the two halves are assembled and held together with rivets all these recesses, bosses and slots line up and hold all parts securely. To form a driver unit, a center section is used in conjunction with the two end caps that are used to form a pole module. In addition to retaining the terminals and pins, the top portion of the center secton is relieved and slotted to accept two lenses which are over two neon lamps on the driver unit printed circuit board. The rear portion of the center section is relieved to accept the printed circuit board. The unit is held together with rivets with preferably two rivets going through the board to insure proper alignment and secure fit of the printed circuit board.

The invention will be more fully understood from the following detailed description and its scope will be pointed out in the appended claims.

DESCRIPTION OF A PREFERRED EMBODIMENT

Figure 1:
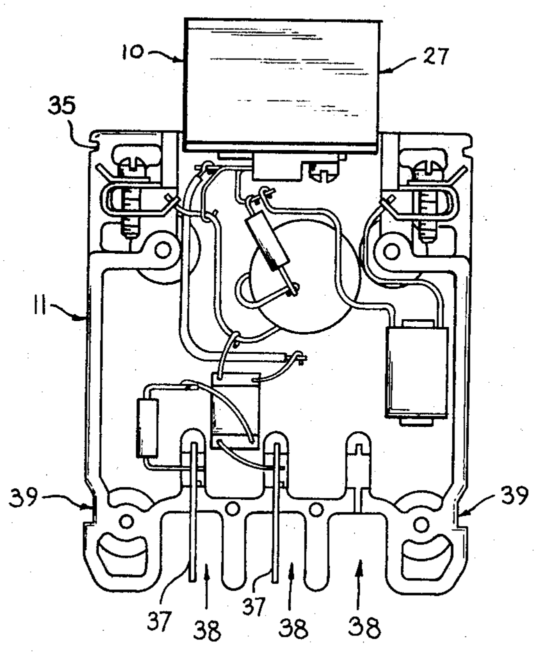
FIG. 1 is a side view of a power pole module of a solid state unit pole relay embodying a housing of modular construction in accordance with the present invention with one side wall removed in order to show the interior of the power pole module.
Figure 2:
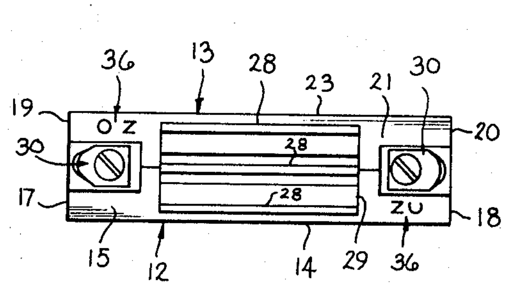
FIG. 2 is a top view of the power pole module in accordance with the present invention.
Figure 3:
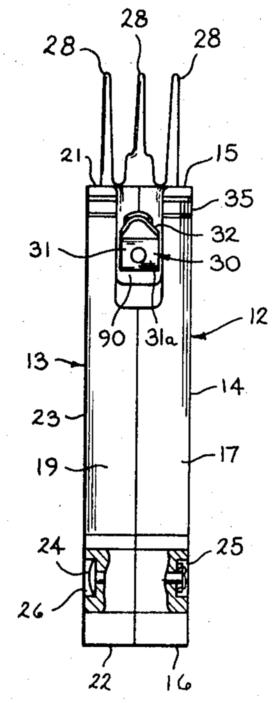
FIG. 3 is an end view of the power pole module in accordance with the present invention.

Referring to FIGS. 1, 2 and 3 of the drawing, there is illustrated therein a power pole module, generally designated by reference numeral 10, of a solid state unit pole relay embodying a housing 11 of modular construction in accordance with the present invention. The housing 11 comprises a pair of multi-purpose, substantially cup-like caps 12, 13 which are preferably molded from suitable insulative is, of the two caps 12, 13 is of substantially identical configuration. Cap 12 includes an end wall 14, top and bottom walls 15 and 16,respectively, and side walls 17 and 18, respectively. Similarly, cap 13 includes a pair of side walls 19 and 20, respectively, top and bottom walls, 21 and 22, respectively, and an end wall 23.

The two caps 12 and 13 are preferably fastened together by means of a plurality of rivets 24. In accordance with the preferred embodiment of the invention, a total of four such rivets 24 are preferably employed with two being utilized in the upper half of the housing and the remaining two in the lower half. The rivets 24 are received in openings 25 and 26 suitably provided for this purpose in end walls 14 and 23 of caps 12 and 13, respectively. When joined together in the aforesaid manner, the caps 12 and 13 provide a housing 11 for a power pole module 10 having a hollow interior in which are housed the circuit components of the module 10. Inasmuch as the manner in which the circuit components of the module 10 are electrically interconnected within the housing 11 is only indirectly related to the present invention, and moreover since the details of this circuit constitute a portion of my invention which is the subject matter of another patent application, Ser. No. 182,059 filed Sept. 20, 1971, and which is assigned to the same assignee as the present invention, it has not been deemed necessary to include in the instant application a description of the circuitry for power pole module 10. Further details regarding the circuitry of the power module 10 may readily be obtained by reference to my aforementioned copending patent application, Ser. No. 182,059.

Referring further to FIGS. 1, 2 and 3 of the drawing, the power pole module 10 is provided with a heat sink 27 which in accordance with the preferred embodiment of the invention is formed of extruded aluminum. Heat sink 27 as best seen with reference to FIG. 3 comprises a plurality of outwardly extending fins 28, and an extended base portion 29 extending at substantially right angles to the fins 28. The latter base portion 29 of heat sink 27 is received in suitably configured recesses (not shown) provided for this purpose in top walls 15 and 21 of caps 12 and 13, respectively, when caps 12 and 13 are joined together in the manner previously described in the preceding paragraph such that the fins 28 project outwardly from power pole module 10 at substantially right angles to the respective top walls 15 and 21 of caps 12 and 13. In accordance with the preferred embodiment of the invention the heat sink 27 of power pole module 10 includes three such fins 28. It is to be understood however that the heat sink 27 may include more or fewer fins 28 without departing from the essence of the invention. The important consideration in this regard is that the heat sink 27 have sufficient heat dissipation capacity to dissipate the heat generated by the circuit components housed in the housing 11 of power pole module 10.

Power pole module 10 as best seen with reference to FIGS. 2 and 3 of the drawing is provided with a pair of externally accessible screw type terminals 30. Each of the terminals 30 includes a substantially U-shaped terminal portion 31, a terminal clamp 32, and a screw 33. In accordance with conventional practice each of the U-shaped terminal portions 31 comprises a pair of spaced, parallel, leg portions (not shown) each having an opening therein with the openings being in overlying concentric relation with respect to each other. At least one of these openings is preferably threaded to make threaded engagement with the screw 33. The terminal clamp 32 which also includes an opening (not shown) is positioned in juxtaposed relation to the upper leg portion of the terminal portion 31 with the opening in terminal clamp 32 being aligned with the openings in the leg portions of the terminal portion 31 such that the screw 33 may be received in the opening in terminal clamp 32 and such that the screw 33 may make threaded engagement with at least one of the openings provided in the leg portions of U-shaped terminal portion 31. It is understood that in a manner well known in the art terminal 30 is also suitably connected within the interior of housing 11 of power pole module 10 to the circuitry housed therein.

The screw terminals 30 are positioned adjacent slots 35 slightly below the upper surface of top walls 15 and 21 of caps 12 and 13, respectively. Although not illustrated in the drawing, if desired, the slots 35 may be employed to receive a suitable plastic cap which may be snapped over the top of housing 11 to cover the wire connections made to the terminals 30. The screw terminals 30 fit on shaped bosses 90 configured to receive the terminals 30 such that when the caps 12 and 13 are joined to form housing 11 as viewed in FIGS. 2 and 3 the terminals 30 are held captive between the side walls 17 and 19 and the side walls 18 and 20, respectively. Further as seen in FIG. 3 of the drawing, suitable legends 36, i.e., NO for normally open and NC for normally closed are located on top walls 21 and 15, respectively, to identify which function of switching is operable when the power pole is affixed to its mounting rail 40 in FIG. 7 as described below.

As illustrated in FIG. 1, power pole module 10 is provided with a pair of pin type terminals 37 which extend outwardly from the bottom of housing 11. Bottom walls 16 and 22 of caps 12 and 13, respectively, which when joined together form the bottom surface of housing 11 are each provided with three compartment-like openings 38. Each of these compartment-like openings 38 is capable of having a pin type terminal 37 positioned therein. In the case of a power pole module 10 only two of the compartment-like openings 38 have a pin type terminal positioned therein. This is dictated by the circuit requirements of the circuitry of a power pole module 10 as described more fully in my aforereferenced copending patent application, Ser. No. 182,059. As illustrated in FIG. 1 the end of each of the pin type terminals 37 which is located within the interior of the housing 11 is suitably connected to the circuit components of the circuitry housed within power pole module 10. A suitable slot is formed in each of the compartment-like openings 38 of each of the end walls 16 and 21 of caps 12 and 13, respectively, whereby when the caps 12 and 13 are joined together as previously described the pin type terminals 37 are held captive in the aforesaid slots and are thus securely retained properly positioned to extend outwardly from the bottom surface of housing 11 approximately centered within a given compartment-like opening 38.

With further reference to FIG. 1, each of the side walls 17, 18 and 19, 20 of caps 12 and 13, respectively, is provided with a notch 39 adjacent the lowermost portion of the aforesaid side walls as viewed with respect to the orientation of FIG. 1. When the caps 12 and 13 are joined together the notches 39 in side walls 17 and 19 are aligned such as to form one long notch 39 extending the entire width of the side wall portion of housing 11 and the notches 39 in side walls 18 and 20 are similarly aligned to form one long notch 39 extending the entire width of the other side wall portion of housing 11. The purpose of providing the pair of notches 39 in the housing 11 will be more fully described hereinbelow in connection with the description of the mounting rail 40 of FIG. 7 of the drawing.

Figure 4:
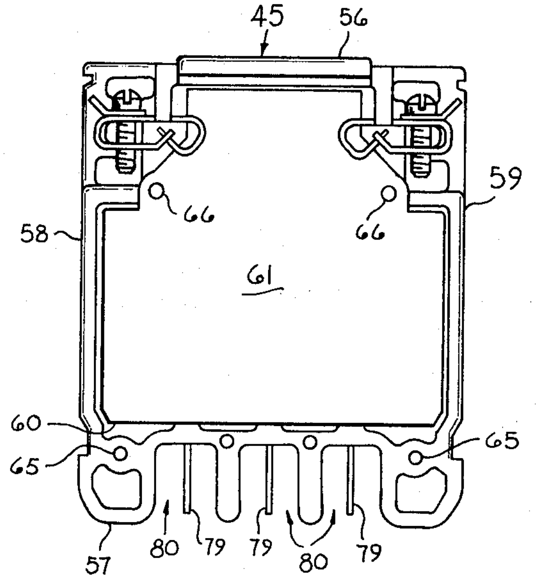
FIG. 4 is a side view of the center section of a driver unit, i.e., control module of a solid state unit pole relay embodying a housing of modular construction in accordance with the present invention.
Figure 5:
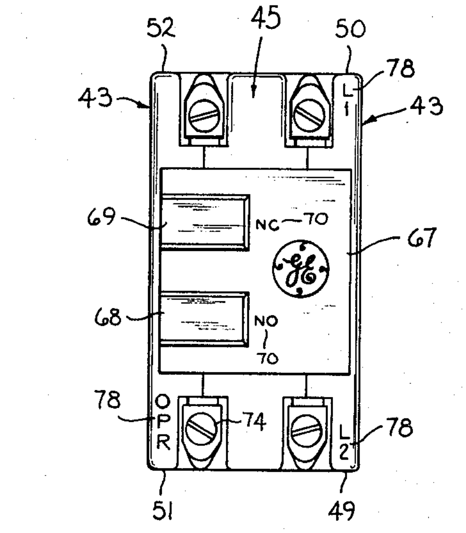
FIG. 5 is a top view of a control module of a solid state unit pole relay embodying a housing of modular construction in accordance with the present invention.
Figure 6:
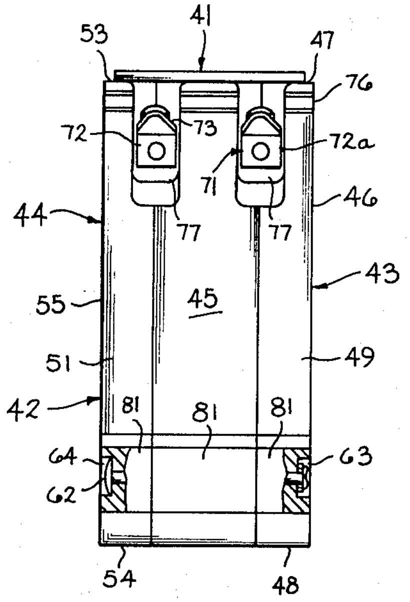
FIG. 6 is an end view of the control module of FIG. 5 in accordance with the present invention.

Referring now to FIGS. 4, 5 and 6 of the drawing, there is illustrated therein a driver unit referred to hereinafter as a control module, generally designated by reference numeral 41, of a solid state unit pole relay embodying a housing 42 of modular construction in accordance with the present invention. The housing 42 comprises a pair of multi-purpose, substantially cup-like caps 43 and 44 which are substantially identical in construction and configuration to the caps 12 and 13 of power pole module 10. The housing 42 further includes a center section 45 which is employed in association with the caps 43 and 44 in a manner to be more fully described hereinafter to form a control module 41. Each of the caps 43 and 44 as well as the center section 45 are preferably formed of suitable insulative material. Cap 43 includes an end wall 46, top and bottom walls 47 and 48, respectively, and side walls 49 and 50, respectively. Similarly cap 44 which is of substantially identical configuration as cap 43 includes a pair of side walls 51 and 52, respectively, top and bottom walls 53 and 54, respectively, and an end wall 55. Center section 45 includes top and bottom walls 56 and 57, respectively, a pair of side walls 58 and 59, respectively, and has one end wall 60 closed by a printed circuit board 61 on which are suitably retained the circuit components (not shown) of the control module 41. The end wall 60 is suitably relieved so as to be capable of receiving and retaining the printed circuit board 61 properly positioned within the relieved portion of end wall 60. The circuitry of control module 41 has not been described and illustrated in the present application inasmuch as it is only indirectly related to the subject matter of the invention of this application and further inasmuch as this circuitry forms a portion of the invention which is the subject matter of my aforereferenced copending patent application, Ser. No. 182,059, filed Sept. 20, 1971.

The two caps 43 and 44 are preferably fastened to the center section 45 on opposite sides thereof by means of a plurality of rivets 62. A total of four such rivets are preferably employed with two being utilized to secure the upper half of the housing 42 and the remaining two serving to secure the lower half of housing 42. The aforementioned upper two rivets 62 are also utilized to secure the printed circuit board 61 in place in juxtaposed relation to the relieved portion of end wall 60 of center section 45. The rivets 62 are received in openings 63 and 64 suitably provided for this purpose in end walls 46 and 55 of caps 43 and 44, respectively, and in the openings 65 provided therefor in center section 45. Also as illustrated in FIG. 4 of the drawing, printed circuit board 61 in its upper half is provided with a pair of openings 66 to receive the aforementioned upper two rivets 62. When joined together in the aforesaid manner, the caps 43 and 44 and the center section 45 provide a housing 42 for a control module 41 having a suitably configured, substantially hollow interior in which are housed the circuit components of the circuitry of the control module 41.

Referring now to FIG. 5 of the drawing, the control module 41 is provided with a cover plate 67 which serves to cover a portion of the top walls 47 and 53 of caps 43 and 44, respectively, as well as the top wall 56 of center section 45. The top wall 56 of center section 45 is relieved in a suitable manner to receive the cover plate 67. Insofar as concerns the caps 43 and 44, the respective top walls 47 and 53 thereof are provided with suitable recesses (not shown) provided to receive the cover plate 67. The latter recesses are substantially identical in configuration to the recesses previously described hereinabove as being provided in the top walls 15 and 21 of caps 12 and 13 of power pole module 10 to receive the extended base portion 29 of heat sink 27. Further as seen with reference to FIG. 5, cover plate 67 is suitably provided with a pair of openings for receiving a pair of lenses 68 and 69. The lenses 68 and 69 serve to cover a pair of neon lamps (not shown) secured on the printed circuit board 61 and which form a part of the circuitry of the control module 41. Suitable legends 70, i.e., NO for normally open and NC for normally closed are affixed to cover plate 67 adjacent the lenses 68 and 69, respectively. In accordance with the mode of operation of the circuitry of control module 41 as described more fully in my aforereferenced copending patent application, the neon lamp positioned below the lens 68 is caused to glow when the control module 41 is functioning in a normally open (NO) mode of operation and similarly the neon lamp positioned in juxtaposed relation to the under surface of lens 69 is caused to glow when the control module 41 is in a normally closed (NC) mode of operation.

Control module 41 as best seen with reference to FIGS. 5 and 6 of the drawing is provided with four externally accessible screw type terminals 71 arranged in two pairs of two each. Each of the screw type terminals 71 is identical in construction to the previously described screw type terminals 30 employed in the power pole module 10. Thus, the screw type terminals 71 each include a substantially U-shaped terminal portion 72, a terminal clamp 73, and a screw 74. Further, each of the U-shaped terminal portions 72 comprises a pair of spaced, parallel, leg portions (not shown) each having an opening therein with the openings being in overlying concentric relation with respect to each other. At least one of these openings is preferably threaded to enable a threaded engagement to be made therewith by the screw 74. The terminal clamp 73 which also includes an opening (not shown) is positioned in juxtaposed relation to the upper leg portion of the terminal portion 72 with the opening in the terminal clamp 73 being aligned with the openings in the leg portions of the terminal portion 72 such that the screw 74 may be received in the opening in terminal clamp 73 and such that the screw 74 may make threaded engagement with at least one of the openings provided in the leg portions of U-shaped terminal portion 72. It is understood that in a manner well known in the art terminal 71 is also suitably connected within the interior of housing 42 of control module 41 to the circuitry housed therein.

The screw terminals 71 are positioned adjacent slots 76 slightly below the upper surface of top walls 47 and 53 of caps 43 and 44, respectively, and top wall 56 of center section 45. Although not illustrated in the drawing, if desired, the slots 76 may be employed to receive a suitable plastic cap which may be snapped over the top of housing 42 to cover the wire connections made to the terminals 71. The screw terminals 71 fit on shaped bosses 77 configured to receive the terminals 71 such that when the cap 43 is affixed by rivets 62 to one end wall of center section 45 one pair of the screw type terminals 71 are held captive between the respective side walls of cap 43 and center section 45. Similarly, as best illustrated in FIG. 6, when the cap 44 is affixed by rivets 62 to the other end wall of center section 45 the other pair of screw type terminals 71 are held captive between the respective side walls of cap 44 and center section 45.

As illustrated in FIG. 4, control module 41 is provided with three pin type terminals 79 which extend outwardly from the bottom of housing 42. Bottom walls 48 and 54 of caps 43 and 44, respectively, and bottom wall 57 of center section 45 which when joined together form the bottom surface of housing 42 are each provided with three compartment-like openings 80, one for each of the pin type terminals 79. It is understood of course that the end (not shown) of each of the pin type terminals 79 which is located within the interior of the housing 42 is suitably connected to the circuit components of the circuitry housed within control module 41. A suitable slot (not shown) is formed in each of the compartment-like openings 80 of each of the end walls of caps 43 and 44 and center section 45 whereby when the caps 43 and 44 are joined to center section 45 as previously described the pin type terminals 79 are held captive in the aforesaid slots and are thus securely retained properly positioned to extend outwardly from the bottom surface of housing 42 approximately centered within a given compartment-like opening 80.

With reference to FIG. 6, each of the side walls 49, 50 and 51, 52 of caps 43 and 44, respectively, as well as each of the side walls 58, 59 of center section 45 is provided with a notch 81 adjacent the lowermost portion of the aforesaid side walls as viewed with respect to the orientation of FIG. 6. When the caps 43 and 44 are affixed to the center section 45 on opposite sides thereof, the notches 81 in side walls 49, 51 and 58 are aligned such as to form one long notch 81 extending the entire width of the side wall portion of housing 42 and the notches 81 in side walls 50, 52 and 59 are similarly aligned to form one long notch 81 extending the entire width of the other side portion of housing 42. The purpose of providing the pair of notches 81 in the housing 42 will be more fully described hereinbelow in connection with the description of the mounting rail 40 of FIG. 7 of the drawing.

Figure 7:
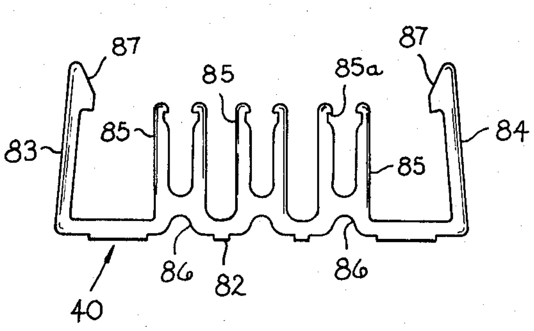
FIG. 7 is a side view of a mounting rail for mounting the control module of FIG. 5 in association with one or more power pole modules of FIG. 1 to form a solid state unit pole relay in accordance with the present invention.
Figure 8:
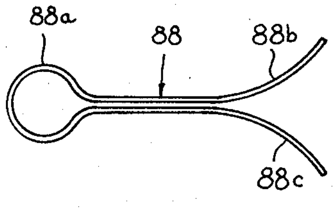
FIG. 8 is a side view of one of the bus strips housed in the mounting rail of FIG. 7 which is employed to electrically interconnect the control module of FIG. 5 with one or more power pole modules of FIG. 1 when the latter modules are mounted in the mounting rail of FIG. 7 in accordance with the present invention.

Referring now to FIG. 7 of the drawing, there is illustrated therein a longitudinally extending mounting rail 40 employed for the purpose of physically mounting and in a manner to be more fully described hereinafter electrically interconnecting the control module 41 in association with one or more power pole modules 10 to form a multi-pole solid state relay. The mounting rail 40 preferably comprises a plastic extrusion which may be provided in any suitable given length such as to be capable of mounting one or more multi-pole solid state relays as determined for example by the particular application in which the relays are to be employed. As depicted in FIG. 7, the mounting rail 40 includes an end wall 82 and a pair of side walls 83 and 84 preferably formed integrally with the end wall 82 and extending outwardly therefrom at substantially right angles thereto. In addition, end wall 82 is provided with three substantially U-shaped upstanding channels 85 preferably formed integrally with the end wall 82. The middle one of the three channels 85 is positioned such as to be approximately equidistant from each of the side walls 83 and 84. The other two channels 85 are slightly spaced an equal amount on either side of the middle channel 85. In accordance with the preferred embodiment of the invention, the end wall 82 is provided with a circular notch 86 located on the under surface of end wall 82 opposite each of the U-shaped upstanding channels 85. The function of the notches 86 is to relieve the stresses which would otherwise be present if end wall 82 were formed as a thick section in the vicinity of each of the U-shaped upstanding channels 85. Although not illustrated in the drawing, at longitudinally spaced intervals along the portions of end wall 82 extending between side wall 83 and the outer channel 85 adjacent thereto and side wall 84 and the other outer channel 85, suitable slots may be provided for the purpose of receiving fastening means for mounting the mounting rail 40 to a suitable surface such as for example some form of metal panel or enclosure, etc.

Each of the side walls 83 and 84 is provided at its outermost end with an inwardly extending hook-like portion 87. The latter are intended to cooperate with the notches 39 formed in the housing 11 of power pole module 10 and with the notches 81 formed in the housing 42 of control module 41. That is, the hook-like portions 87 through their engagement either with the notches 39 or the notches 81 serve to securely retain the power pole module 10 or the control module 41 mounted to the mounting rail 40. More particularly, to mount either the power pole module 10 or the control module 41 to the mounting rail 40 the particular module is inserted inwardly into the mounting rail 40 whereby the side walls 83 and 84 thereof which as depicted in FIG. 7 are formed such as to incline slightly inwardly are forced outwardly by engagement with the module housing until the module is inserted downwardly a sufficient distance to permit the hook-like portion 87 to snap inwardly into the notches provided therefor in the side walls of the module housing. As the particular module is inserted downwardly into the mounting rail 40 the compartment-like openings 38 of power pole module 10 or the compartment-like openings 80 of control module 41 as the case may be each receive therein a U-shaped upstanding channel 85 such that with the particular module seated in the mounting rail 40 the U-shaped upstanding channels 85 are encompassed by either the compartment-like openings 38 or the compartment-like openings 80. To remove the module from the mounting rail 40, it is merely necessary to disengage the hook-like portions 87 by any suitable means from the notches 39 or the notches 81 as the case may be and then withdraw outwardly the desired module out of the mounting rail 40.

In each of the U-shaped upstanding channels 85 there is provided a bus strip 88 formed of suitable conductive material, which as illustrated in FIG, 8 has a circular base portion **88*a* and a pair of leg portions 88*b* and 88*c* which for a portion of their length extend in slightly spaced relation to each other but which have their outermost ends suitably flared outwardly away from each other. To mount the bus strip 88 in a channel 85, the bus strip 88 is merely inserted downwardly therein until circular base portion 88*a* engages the bottom of the channel 85 and such that the outwardly flared end portions of the leg portions 88*b* and 88*c* of bus strip 88 are captured in the hook-like portion 85*a* provided therefor at the outer end of each of the side members of the U-shaped upstanding channels 85. With a bus strip 88 emplaced in each of the U-shaped upstanding channels 85, when either a power pole module 10 or a control module 41 is mounted as described in the preceding paragraph on the mounting rail 40 the pin type terminals 37 or 79 as the case may be are inserted between the leg portions 88*b* and 88*c* of the bus strip 88 in the area thereof wherein the leg portions 88*b* and 88*c* extend in slightly spaced relation to each other. As such, the bus strip 88 functions to electrically interconnect the pin type terminals 79 of control module 41 with the pin type terminals 37 of one or more power pole modules 10 which constitute a given multi-pole solid state relay. It is possible to electrically interconnect in this manner one control module 41 with in the order of approximately 20 power pole modules 10 such that one control module 41 serves to drive approximately 20 power pole modules 10**.

It should be readily apparent that the physical configuration and the electrical circuitry of power pole module 10 is such that whether a particular power pole module 10 has a normally open mode of operation or a normally closed mode of operation is dependent entirely solely on the manner in which the subject power pole module 10 is mounted on mounting rail 40. That is when a power pole module 10 is mounted on mounting rail 40 the centermost pin type terminal 37 of the module 10 will always engage the bus strip 88 retained in the centermost U-shaped channel 85 of mounting rail 40. However, the other pin type terminal 37 of power pole module 10 can be made to engage the bus strip 88 retained in either one of the two outermost U-shaped channels 85, depending on the orientation of the power pole module 10 as it is moved downwardly for mounting onto the mounting rail 40. One of the outer bus strips 88 constitutes the normally open rail of the mounting rail 40 while the other outer bus strip 88 comprises the normally closed rail thereof. Thus when the outermost pin type terminal 37 of power pole module 10 is inserted into the normally open rail of mounting rail 40 the power pole module 10 is provided with a normally open mode of operation and similarly when the outer most pin type terminal 37 of power pole module 10 is inserted into the normally closed rail of mounting rail 40 the power pole module 10 is provided with a normally closed mode of operation. It is therefore seen that to convert the power pole module 10 from a normally open mode of operation to a normally closed mode of operation or vice versa, the power pole module 10 need only be removed from the mounting rail 40, turned end for end, and reinserted into the mounting rail 40 such that the outermost pin type terminal 37 of power pole module 10 which had been engaged with the normally open rail of mounting rail 40 is now engaged with the normally closed rail of mounting rail 40 or vice versa.

Several different multi-pole solid state relays may be mounted on one mounting rail 40. In order to electrically isolate one such relay from another, the bus strips 88 for each relay are cut to the desired length and inserted into the U-shaped upstanding channels 85. The discontinuity between the bus strips 88 inserted in the same channel 85 serves to electrically isolate one relay from another. In accordance with the preferred embodiment of the invention, to facilitate identifying which power pole modules 10 are associated with which control module 41, a plane white plastic indicator barrier is preferably inserted in the mounting rail 40 to indicate where one multi-pole relay stops and the next one starts.

Thus, in accordance with the present invention there has been provided a novel and improved housing of modular construction which is capable of being used by itself to form a complete enclosure for the circuitry of a power pole module of a solid state relay. Further in accordance with the present invention such a housing also has the capability of being used in conjunction with a central section to form the enclosure for the circuitry of a control module of a solid state relay. In addition such a housing of module construction enables the pole capacity of the relay to be readily augmented without requiring extensive structural modification in the relay. Moreover the subject housing includes the inherent flexibility of being capable of being readily adapted by the user for employment in different applications as the user's work requirements for a relay change. Finally, the housing of the present invention is relatively inexpensive to manufacture, easy to assemble, and easy to apply in a given application.

While only two embodiments of my invention have been shown, it will be appreciated that modifications thereof may readily be made therein by those skilled in the art. A number of such modifications have been mentioned in the course of the preceding description of the subject invention. I therefore intend by the appended claims to cover such modifications as well as all other modifications which fall within the true spirit and scope of my invention.

What I claim as new and desire to secure by Letters Patent of the United States is:

1. A modular housing assembly for an electrical device comprising:

a. a first housing member consisting of a pair of side walls, a top and a bottom wall, a closed end wall, and an open end wall;

b. each of said pair of side walls of said first housing member including terminal receiving means;

c. said bottom wall of said first housing member having at least two compartment-like openings formed therein, each of said two compartment-like openings including terminal receiving means;

d. said closed end wall of said first housing member including fastener receiving means;

e. a second housing member consisting of a pair of side walls, a top and a bottom wall, a closed end wall, and an open end wall;

f. each of said pair of side walls of said second housing member including terminal receiving means;

g. said bottom wall of said second housing member having at least two compartment-like openings formed therein, each of said two compartment-like openings including terminal receiving means;

h. said closed end wall of said second housing member including fastener receiving means;

i. first terminal means for making an external electrical connection to said modular housing assembly;

j. second terminal means for making an external electrical connection from said modular housing assembly;

k. circuit means connected in circuit relationship with said first terminal means and with said second terminal means; and l. fastener means received in said fastener receiving means of said closed end wall of said first housing member and in said fastener receiving means of said closed end wall of said second housing member to join said first housing member and said second housing member with said open wall of said first housing member facing toward said open end wall of said second housing member to provide said housing assembly with a hollow interior in which said circuit means is enclosed, and with said first terminal means mounted in said terminal receiving means of said pair of side walls of said first housing member and in said terminal receiving means of said pair of side walls of said second housing member, and with said second terminal means mounted in said at least two compartment-like openings in said bottom wall of said first housing member and in said at least two compartment-like openings in said bottom wall of said second housing member.

2. A modular housing assembly as set forth in claim 1 further comprising:

a. heat sink means including a plurality of heat fins and a base portion extending at right angles to said plurality of heat fins;

b. said top wall of said first housing member including a recessed portion;

c. said top wall of said second housing member including a recess portion;

d. said heat sink means being supported in said top wall of said first housing member and in said top wall of said second housing member with said plurality of heat fins extending outwardly from said top wall of said first housing member and from said top wall of said second housing member, and with said base portion of said heat sink means mounted in said recessed portion of said top wall of said first housing member and in said recessed portion of said top wall of said second housing member.

3. A modular housing assembly as set forth in claim 2 wherein:

a. said first housing member is joined to said second housing member with said open end wall of said first housing member in abutting engagement with said open end wall of said second housing member;

b. said first terminal means comprises a pair of screw type terminals;

c. said second terminal means comprises a pair of pin type terminals; and d. said fastener means comprising a plurality of rivets.

4. A modular housing assembly as set forth in claim 1 further comprising:

a. a center section having a pair of side walls, a top and a bottom wall, and a pair of end walls;

b. each of said pair of side walls of said center section including a pair of terminal receiving means;

c. said bottom wall of said center section having three compartment-like openings formed therein, each of said three compartment-like openings including terminal receiving means;

d. each of said bottom walls of said first and second housing members having three compartment-like openings, each of said three compartment-like openings including terminal receiving means;

e. said fastener means joining said first housing member to said center section with said open end wall of said first housing member in abutting engagement with one of said pair of end walls of said center section, and said fastener means further joining said second housing member to said center section with said open end wall of said second housing member in abutting engagement with the other of said pair of end walls of said center section.

5. A modular housing assembly as set forth in claim 4 wherein:

a. said top wall of said center section has an opening therein;

b. a cover member is retained in said opening in said top wall of said center section; and c. said cover member includes a pair of lenses to permit a visual indication of the mode of operation of said circuit means.

6. A modular housing assembly as set forth in claim 5 wherein:

a. said first terminal means includes a first pair and a second pair of screw type terminals;

b. said first pair of screw type terminals is received in said terminal receiving means of said pair of side walls of said first housing member and in one of said pair of terminal receiving means in said pair of side walls of said center section;

c. said second pair of screw type terminals is received in said terminal receiving means of said pair of side walls of said second housing member and in the other of said pair of terminal receiving means in said pair of side walls of said center section;

d. said second terminal means includes three pin type terminals retained in said compartment-like openings in said bottom wall of said first housing member, and said center section; and e. said fastener means comprises a plurality of rivets.

7. In a multi-pole solid state relay including a control relay module, at least one controlled relay module, a mounting rail including mounting means for mounting said control relay module and said at least one controlled relay module to said mounting rail and said mounting rail further including bus means for electrically interconnecting said control relay module and said at least one controlled relay module such that said control relay module electrically controls said at least one controlled relay module, the improvement comprising:

a. a control modular housing assembly for said control relay module including a first housing member, a second housing member, a center section, a first terminal means for making an external electrical connection to said control modular housing assembly, a second terminal means for making an external electrical connection from said control modular housing assembly to said bus means, and circuit means connected in circuit relationship with said first terminal means and said second terminal means;

b. said first housing member and said second housing member of said control modular housing assembly each including a pair of side walls, a top and a bottom wall, a closed end wall, and an open end wall;

c. said center section of said control modular housing assembly including a pair of side walls, a top and a bottom wall, and a pair of end walls;

d. said control modular housing assembly further including fastener means joining said first housing member to said center section with said open end wall of said first housing member in abutting engagement with one of said pair of end walls of said center section and joining said second housing member to said center section with said open end wall of said second housing member in abutting engagement with the other of said pair of end walls of said center section, and with said first terminal means mounted between said pair of said walls of said first housing member, said center section, and said second housing member, and with said second terminal means mounted in said bottom wall of said first housing member, said center section, and said second housing member;

e. a controlled modular housing assembly for said at least one controlled relay module being in electrical cooperation with said control modular housing assembly and including a first housing member, a second housing member, heat sink means, a first terminal means for making an external electrical connection to said controlled modular housing assembly, a second terminal means for making an external electrical assembly from said controlled modular housing assembly to said bus means, and circuit means connected in circuit relationship with said first terminal and said second terminal means;

f. said first and second housing members of said controlled modular housing assembly each including a pair of side walls, a top and bottom wall, a closed end wall, and an open end wall; and g. said controlled modular housing assembly further including fastener means joining said first housing member to said second housing member with said open end wall of said first housing member in abutting engagement with said open end wall of said second housing member, and with said first terminal means mounted in said side walls of said first and second housing members, and with said second terminal means mounted in said bottom wall of said first and second housing members, and with said heat sink means supported on an extending outwardly from said top wall of said first and second housing members.

8. In a multi-pole solid state relay as set forth in claim 7 wherein said controlled modular housing assembly for each of said at least one controlled relay modules is mounted on said mounting rail in either a first position or a second position such that when said controlled modular housing assembly for each of said at least one controlled relay modules is mounted on said mounting rail in said first position said second terminal means of said controlled modular housing assembly engages said bus means of said mounting rail to provide said at least one controlled relay module with a first mode of operation and when said controlled modular housing assembly for each of said at least one controlled relay modules is mounted on said mounting rail in said second position said second terminal means of said controlled modular housing assembly engages said bus means of said mounting rail to provide said at least one controlled relay module with a second mode of operation.

* * * * *